Feb. 9, 1943.    F. D. JOESTING    2,310,293
CONDITION RESPONSIVE CONTROLLER
Filed April 18, 1941    2 Sheets-Sheet 1

INVENTOR.
Frederick D. Joesting
BY George H. Fisher
Attorney

Feb. 9, 1943.　　　　F. D. JOESTING　　　　2,310,293
CONDITION RESPONSIVE CONTROLLER
Filed April 18, 1941　　　2 Sheets-Sheet 2

INVENTOR.
Frederick D. Joesting
BY George H. Fisher
Attorney

Patented Feb. 9, 1943

2,310,293

UNITED STATES PATENT OFFICE 2,310,293

CONDITION RESPONSIVE CONTROLLER

Frederick D. Joesting, Oak Park, Ill., assignor to Minneapolis-Honeywell Regulator Company, Minneapolis, Minn., a corporation of Delaware Application April 18, 1941, Serial No. 389,188

10 Claims. (Cl. 236—1)

This invention relates to the art of condition responsive controllers and is particularly directed to the construction of a pneumatic thermostat.

The principal object of the invention is to provide a condition responsive controller of the pneumatic type in which a single sensitive element will increase the control air pressure on an increase in the value of the condition or decrease the control air pressure on an increase in the value of the condition as desired. This changeover would commonly be termed a change from "direct acting" to "reverse acting."

Another object of the invention is to provide an instrument of the above mentioned characteristics in which the change from "direct acting" to "reverse acting" or vice versa is accomplished by a change in the pressure of the supply air.

Another object is to provide a pneumatic thermostat of the "summer-winter" type in which the change from "direct acting" to "reverse acting" or vice versa is accomplished by a change in the pressure of the supply air.

Another object is to provide a condition responsive controller of the pneumatic type having a single sensitive element and a single valve which may be changed from "direct acting" to "reverse acting."

Another object of the invention is to provide a condition responsive controller which is adapted to control the value of the condition at either of two separate and independently adjustable values.

Other objects will be apparent from the drawings and from the specification.

The illustrative embodiment of the invention is a pneumatic "summer-winter" thermostat in which a single thermostatic element operates a single valve unit for controlling the pressure in a control line. Two sets of linkages are provided between the thermostatic element and the valve, one of the linkages being used during the winter or when heating is required and the other linkage being used in the summer or when cooling is required. The control is "direct acting" in the winter and "reverse acting" in the summer. By this is meant that during the winter the thermostatic element operates the valve to increase the control line pressure as the temperature increases and during the summer the thermostatic element operates the valve to decrease the control line pressure as the temperature increases. The changeover from summer to winter operation is accomplished by establishing different pressures in the supply line which supplies the compressed air for the system. In the summer a supply line pressure of thirteen pounds per square inch may be used and this pressure acting on a relay fills an auxiliary bellows with air to throw the winter linkage out of operation and place the control on the summer linkage. Likewise in the winter the supply pressure may be set at seventeen pounds causing the relay to bleed the air pressure from the auxiliary bellows, which operation places the summer linkage out of operation and releases the winter linkage for controlling the branch line pressure at a different value and "direct acting" rather than "reverse acting."

Figure 1:
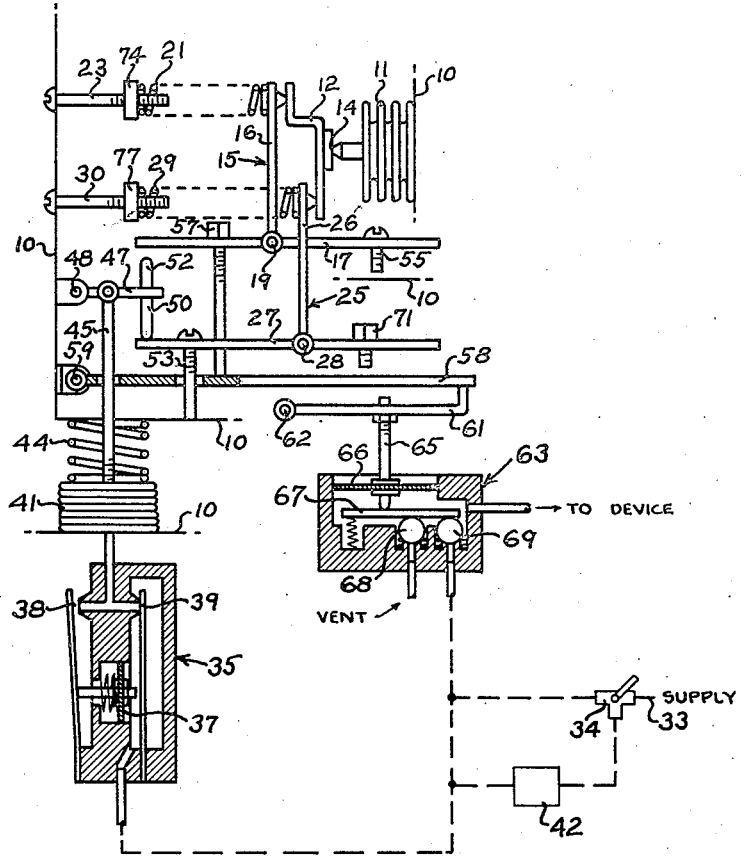
Fig. 1 is a diagrammatic showing of a summer-winter pneumatic thermostat.
Figure 2:
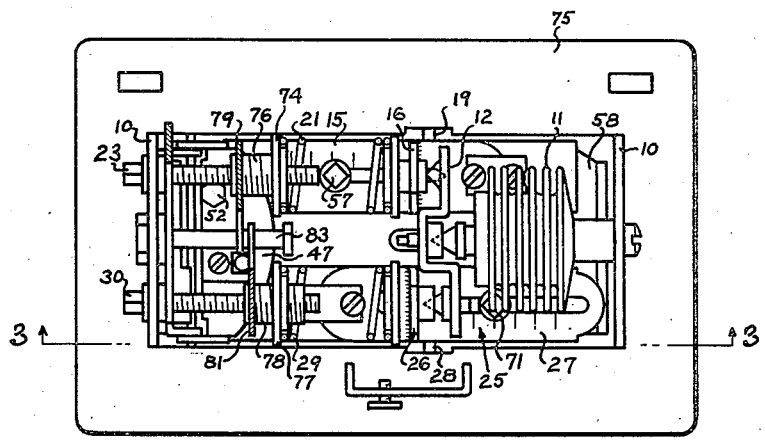
Fig. 2 is a plan view of the actual instrument with the cover removed.
Figure 3:
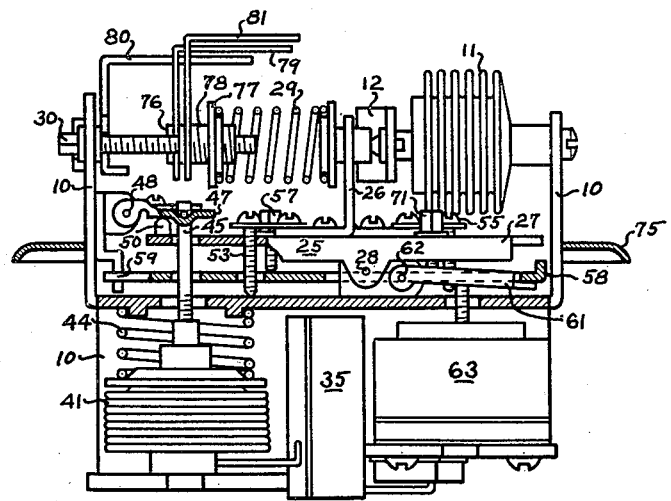
Fig. 3 is an elevation, partly in section, taken on line 3—3 of Fig. 2.

For the purpose of illustration, a diagrammatic view, Fig. 1, has been used to enable a simple explanation of the device. Figs. 2 and 3 show the instrument as it is actually being built. Corresponding reference characters are used on the corresponding parts of all the figures.

The various parts of the instrument are mounted on a pressed metal frame 10 as seen in Figs. 2 and 3. Frame 10 has been illustrated diagrammatically in Fig. 1 by a single line which appears in several places in the view. A thermostatic bellows 11 of the volatile fill type is mounted on the frame 10 and engages an operating lever 12 at a point approximately midway between the ends of the lever 12 in a pivot 14. The upper end of operating lever 12, as seen in Figs. 1 and 2, engages a winter lever 15 which includes a vertical portion 16 and a horizontal portion 17 pivoted in the frame 10 at 19. An adjustment spring 21 acting in compression extends between the vertical portion 16 of the lever 15 and a winter setting screw 23 which is carried by the frame 10. The lower end of the operating lever 12 engages the summer lever 25 which comprises a vertical portion 26 and a horizontal portion 27 pivoted in the frame 10 at 28. An adjusting spring 29 acting in compression extends between the vertical portion 26 of the lever 25 and a summer setting screw 30 which is carried by the frame 10.

With the various parts in the position shown, the instrument is in a condition to operate "direct acting" and is therefore on the winter cycle. Hence the winter lever 15 is in operation and the summer lever 25 has been rendered inoperative.

Compressed air is supplied to the system at 33 to a three-way valve 34 which in the position shown transmits the air directly to the instrument. It will be understood that some automatic means such as an outdoor thermostat could be used to perform the function of the three way valve 34. The air supply is transmitted to a relay 35 and is impressed on a diaphragm 37 which at seventeen pounds pressure opens a bleed valve 38 and closes a supply valve 39 to an auxiliary bellows 41 which is mounted on the frame 10 of the instrument. For a more complete showing of the relay unit 35 reference may be had to my co-pending application, Serial No. 350,003, filed August 2, 1940. The bellows 41 is now collapsed. In the summer the valve 34 is positioned to supply air to a reducing valve 42 which reduces the air pressure to thirteen pounds. When this pressure acts on the diaphragm 37 of the relay 35, it will move to the right closing the bleed valve 38 and opening the supply valve 39 to supply the full thirteen pounds pressure to the bellows 41. The pressure will overcome the force of spring 44. When no pressure is impressed on the bellows 41 it will assume the collapsed position shown, permitting the spring 44 to move the rod 45 downwardly. The rod 45 is pivoted to a switching lever 47 which in turn is pivoted at 48 in the frame 10. The switching lever 47 is supplied with an abutment 50 which is adapted to engage the summer lever 25 and an abutment 52 which is adapted to engage the winter lever 15. In the actual instrument the abutment 52 is a tension member since the summer lever 25 and the winter lever 15 are mounted side by side with the switching lever 47 above both of them. The summer lever 25 is supplied with a stop screw 53 which engages the frame 10 when the abutment 50 of the switching lever 47 is forced downwardly by the spring 44. In this position the summer lever 25 is rendered inoperative. Likewise when pressure is supplied to the bellows 41 the spring 44 is compressed and the switching lever 47 is moved upwardly so that the summer lever 25 is released and the abutment 52 engages the winter lever 15 to rotate it in a clockwise direction until the winter stop screw 55 engages the frame 10. In this position the winter lever is rendered inoperative and the thermostatic bellows 11 is free to position the summer lever 25.

The winter lever 15 is supplied with an adjustment button 57 which forms a connection between the lever 15 and a valve operating lever 58 which is pivoted at 59 to the frame 10. The valve operating lever 58 in turn positions a reduction lever 61 pivoted in the frame 10 at 62 which actuates the valve device 63. The showing in Fig. 1 of the valve device 63 is somewhat diagrammatic. For a detailed description of this valve device reference may be had to my co-pending application, Serial No. 350,003, filed August 2, 1940. The reduction lever 61 operates the valve by means of a rod 65 which passes through a diaphragm 66. As the rod 65 moves downwardly from the position shown, lever 67 pivots in a counterclockwise direction about the vent valve 68 to open the supply valve 69. Likewise as the rod 65 moves upwardly the lever 67 pivots in a clockwise direction about the supply valve 69 to open the vent valve 68. When the instrument is in balance both supply and vent valves are closed. When a predetermined downward force is supplied by the rod 65, the supply or vent valve will be opened until the upward force beneath the diaphragm 66 due to air pressure just equals the downward force exerted by the rod 65. Hence the pressure supplied to the device being controlled, which is the pressure beneath the diaphragm 66, will depend on the force exerted by the rod 65, which in turn depends on the pressure within the thermostatic bellows 11, the adjustment of the spring 21, and the location of the adjustment button 57 which determines the over-all lever ratio.

The summer lever 25 is also supplied with an adjustment button 71 which engages the lever 58 when air pressure is supplied to the bellows 41 to release the summer lever and force the stop 55 of the winter lever 15 into engagement with the frame 10. With the device operating on the winter cycle as shown, the summer lever 25 has been moved in a counter-clockwise direction and the stop screw 53 has engaged the frame 10. With the parts in this position the operating lever, which is engaged by the thermostatic bellows 11, is free to rotate about its pivot in the summer lever 25 in order to position the winter lever 15. Likewise when the bellows 41 is filled with air under pressure, the stop screw 55 of the winter lever 15 engages the frame 10 and the operating lever 12 rotates about its pivot in the winter lever 15 to position the summer lever 25.

It will be noted that as the temperature increases the pressure within the thermostatic bellows 11 also increases. The winter lever 15 will be rotated slightly in a counter-clockwise direction and the winter adjustment button 57 will transmit this movement to the lever 58 to rotate it in a clockwise direction to exert a greater downward force on the rod 65. This will open the supply valve to increase the branch line pressure supplied to the device being controlled. When the branch line pressure is increased to the proper value the supply valve will be closed again. On the other hand, during summer operation an increase in pressure in the thermostatic bellows 11 will rotate the summer lever 25 slightly in a counter-clockwise direction, but this movement will be transmitted through the summer adjustment button 71 to the lever 58 to move it in a counter-clockwise direction which will act on the valve 63 to reduce the branch line pressure. Thus it will be noted that the device is "direct acting" in winter and "reverse acting" in summer.

The valve unit 63 is the same unit which is used on other devices built by the same manufacturer. This is done in order to reduce manufacturing costs. Likewise the thermostatic bellows 11 is similar to those used on other devices. In this particular instrument the operating lever 12 reduces the force available on the winter lever 15 and on the summer lever 25 to half the value that would be present if the thermostatic bellows 11 operated directly on either of these levers. Hence the reduction lever 61 is employed to obtain the force necessary at the valve unit 63 for its proper operation.

The instrument as actually manufactured and as shown in Figs. 2 and 3 is supplied with a wall plate 75 for mounting it on the wall of a room. A suitable cover (not shown) is also supplied with the instrument. The cover is provided with an opening through which temperature setting indicators may be seen. These indicators are of the type shown in my copending application, Serial No. 350,003 filed August 2, 1940. The winter adjustment spring 21 is mounted on a spring abutment nut 74 which is in turn screw threaded on a calibration nut 76 and the summer adjustment spring 29 is mounted on a spring abutment nut 77 which is in turn screw threaded on a summer calibration nut 78. These calibration nuts are in turn screw threaded on the corresponding setting screws. In this way provision is made for calibrating the springs with respect to the temperature setting indicators. The temperature setting may then be varied as desired by means of the winter setting screw 23 and the summer setting screws 30. A winter temperature setting indicator 79 is secured to the winter calibration nut 76 and cooperates with suitable indicia on a scale 80 the bottom edge of which is seen in Figure 3, which is secured to the frame 10. Likewise a summer temperature indicator 81 is secured to the summer calibration nut 78. This indicator also cooperates with the scale 80 and both the summer and winter indicators are visible through the opening in the cover. Adjustment of the control point of the instrument which is the temperature indicated by the winter indicator 79 or by the winter indicator 81 is accomplished by adjustment of the corresponding setting screws 23 and 30. By turning the spring abutment nut 74 on the winter calibration nut 76 the tension of spring 21 may be varied so that the device will control at the indicated temperature. The relation between the summer indicator 81 and the tension of spring 29 may be varied in a similar manner. The winter indicator 79 is so formed as to cooperate with a post 83 which is secured to the frame 10 to prevent rotation of the calibration nut as the setting screw is turned. The summer indicator 81 is also provided with a portion which cooperates with the post 83 for the same purpose.

As seen in Fig. 2, the summer adjustment button 71 and the winter adjustment button 57 are mounted in slots in their corresponding levers so that they may be moved longitudinally to change the lever ratio between the thermostatic bellows and the valve operating lever 58. As these adjustment buttons are moved outwardly from the pivots of the corresponding levers, the thermostatic bellows has a smaller leverage on the valve operating lever 58 and hence a greater change in force at the thermostatic bellows is necessary to produce a predetermined change in the downward force on the diaphragm 66 of the valve unit 63. Therefore moving the adjustment buttons outwardly causes the device to operate with a greater "differential." With the adjustment button moved to its innermost position a change of only 3° F. may be sufficient to change the branch line pressure from zero to supply pressure, while when the button is moved to its outermost position a temperature change of 10° F. may be necessary to cause the same pressure change.

While most of the features of this invention are directed to a pneumatic summer-winter thermostat, there are certain features which would be equally applicable to a thermostat adapted to actuate an electric switch. Likewise other features of the invention would be equally applicable to a thermostat with which it was desired to merely change the control point of the instrument rather than change from direct to reverse acting. Also it is not essential that the condition responsive element be sensitive to temperature but it might equally well be a pressure responsive bellows or some instrumentality responsive to humidity. It is to be understood that I am not to be limited to the specific disclosure of the illustrative embodiment of the invention but am to be limited only by the scope of the appended claims.

I claim as my invention:

1. In a pneumatic control device, in combination, control valve means for determining the pressure in a control line, first linkage means for operating said valve means, second linkage means for operating said valve means, a lever connecting said linkage means, a condition responsive element acting on said lever at a point intermediate its ends, and means for rendering said first or said second linkage means effective selectively to transmit force produced by said element to said valve means.

2. In a pneumatic control device, in combination, control valve means for determining the pressure in a control line, first linkage means for operating said valve means, second linkage means for operating said valve means, a lever connecting said linkage means, a condition responsive element acting on said lever at a point intermediate its ends, means for rendering said first or said second linkage means effective selectively to transmit force produced by said element to said valve means, means associated with said first linkage means for adjusting the value of the condition at which said element actuates said valve means when said valve means is positioned through said first linkage means, and means associated with said second linkage means for adjusting the value of the condition at which said element actuates said valve means when said valve means is positioned through said second linkage means.

3. In a pneumatic control instrument, in combination, control valve means for determining the pressure in a control line, a primary lever adapted to actuate said valve means, a pair of secondary levers each of which is adapted to position said primary lever, an operating lever pivoted to each of said secondary levers, a condition responsive element for positioning a point on said operating lever intermediate its points of connection to said secondary levers, and means for rendering either of said secondary levers effective selectively to transmit force produced by said element to said valve means.

4. In a pneumatic control instrument, in combination, control valve means for determining the pressure in a control line, a primary lever adapted to actuate said valve means, a pair of secondary levers each of which is adapted to position said primary lever, an operating lever pivoted to each of said secondary levers, a condition responsive element for positioning a point on said operating lever intermediate its points of connection to said secondary levers, means for rendering either of said secondary levers effective selectively to transmit force produced by said element to said valve means, and adjusting spring means acting on said secondary levers to determine the control point of the instrument when either of said secondary levers is effective.

5. In a summer-winter pneumatic thermostat, in combination, a base, control valve means, a primary lever pivoted in said base for positioning said valve means, a pair of secondary lever pivoted in said base on axes parallel to the pivot for said primary lever and between the pivot for said primary lever and the point at which it actuates said valve means, connections between said secondary lever and said primary lever, one of said connections being located between the pivots for the primary lever and for the associated secondary lever and the other connection being located on the opposite side of the secondary lever pivot, an operating lever pivoted in each of said secondary levers, a temperature responsive bellows mounted on said base for positioning a point on said operating lever intermediate its pivots in said secondary levers, a pair of adjusting springs acting between said base and said secondary levers to oppose through said operating lever expansion of said bellows, and means for rendering either of said secondary levers effective selectively to transmit force produced by said bellows to said valve means.

6. In a pneumatic control instrument, in combination, a pair of levers, a condition responsive element for positioning said levers, a control valve unit, a valve operating member adapted to be engaged by either of said levers for mechanically transmitting a force from said condition responsive element to said control valve unit, and pressure controlled means for disengaging said levers from said valve operating member selectively.

7. In a control device, in combination, a control element, first linkage means for operating said control element, second linkage means for operating said control element, a lever interconnecting said linkage means, a condition responsive element acting on said lever at a point intermediate its ends, and means adapted selectively to move said first linkage means of a predetermined position and simultaneously place said control element under the control of said condition responsibe means through said second linkage means or to move said second linkage means to a predetermined position and simultaneously to place said control element under the control of said condition responsive means through said first linkage means.

8. In a pneumatic control instrument, in combination, a control valve for determining the pressure in a control line, a condition responsive element, first linkage means adapted to mechanically transmit forces developed by said element upon variations in the value of said condition to said valve in a manner to raise the pressure in the control line on an increase in the value of the condition, second linkage means adapted to mechanically transmit forces developed by said element upon variation in the value of said condition to said valve in a manner to lower the pressure in the control line on an increase in the value of the condition, and means for rendering said first or said second linkage means movable selectively to transmit forces developed by said element to said valve.

9. In a condition responsive device, in combination, a control element, a condition responsive element, first and second mechanical linkage means adapted to mechanically transmit forces developed by said condition responsive element upon variations in the value of said condition to said control element, said means for rendering said first or said second linkage means movable selectively to transmit forces developed by said condition responsive element to said control element.

10. In a condition responsive device, in combination, a control element, a condition responsive element, first and second mechanical linkage means adapted to mechanically transmit the force produced by said condition responsive element to said control element, means for rendering said first or said second linkage means effective selectively to transmit force produced by said condition responsive element to said control element, and means associated with said first and said second linkage means for adjusting the value of the condition at which said condition responsive element actuates said control element.

FREDERICK D. JOESTING.

CERTIFICATE OF CORRECTION.

Patent No. 2,310,293. February 9, 1943.

FREDERICK D. JOESTING.

It is hereby certified that error appears in the printed specification of the above numbered patent requiring correction as follows: Page 4, first column, line 26, claim 7, for "of" read --to--; first column, line 29, for "responsibe" read --responsive--; and second column, line 20, claim 9, for "said" second occurrence, read --and--; and that the said Letters Patent should be read with this correction therein that the same may conform to the record of the case in the Patent Office.

Signed and sealed this 20th day of April, A. D. 1943.

(Seal)

Henry Van Arsdale,
Acting Commissioner of Patents.